(12) United States Patent
Miyamoto

(10) Patent No.: US 7,261,576 B2
(45) Date of Patent: Aug. 28, 2007

(54) CARD CONNECTOR

(75) Inventor: Osamu Miyamoto, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/493,742

(22) Filed: Jul. 27, 2006

(65) Prior Publication Data

US 2007/0037422 A1 Feb. 15, 2007

(30) Foreign Application Priority Data

Aug. 10, 2005 (JP) ............................. 2005-232122

(51) Int. Cl.
*H01R 13/62* (2006.01)
(52) U.S. Cl. ..................................... 439/159; 439/152
(58) Field of Classification Search ................ 439/159, 439/152, 157, 629, 630
See application file for complete search history.

(56) References Cited

U.S. PATENT DOCUMENTS 6,439,903 B1 * 8/2002 Burkart ....................... 439/159
6,652,299 B2 * 11/2003 Sato ........................... 439/159
7,004,770 B2 * 2/2006 Wu ............................. 439/159
7,066,748 B2 * 6/2006 Bricaud et al. ............. 439/159
7,070,430 B2 * 7/2006 Yang et al. .................. 439/159
2006/0172572 A1 * 8/2006 Matsukawa et al. ......... 439/159

FOREIGN PATENT DOCUMENTS

JP 2000-148927 5/2000
JP 2005-108763 4/2005

* cited by examiner

*Primary Examiner*—Hien Vu
(74) *Attorney, Agent, or Firm*—Takeuchi & Kubotera, LLP

(57) ABSTRACT

A card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out. In the card connector, the ejection unit includes an inclining member for inclining downwardly a portion of the ejection unit to be pulled out toward the direction that the card is pulled out when the spring member urges the ejection unit in the direction that the card is pulled out.

6 Claims, 6 Drawing Sheets

CARD CONNECTOR

BACKGROUND OF THE INVENTION AND RELATED ART STATEMENT

The present invention relates to a card connector, and more specifically, to a card connector with an ejection mechanism of a push-push type. In the card connector of the invention, it is easy to insert a card.

Patent Reference has disclosed a conventional card connector with an ejection mechanism of a push-push type. In such a card connector, a tray is disposed to eject outside the card connector for covering a bottom surface and side surfaces of a card, so that the card is inserted into the card connector. When the card is removed from the card connector, the tray is ejected again. Accordingly, a mechanism for ejecting the tray determines how easy a card can be inserted into the card connector.

Patent Reference: Japanese Patent Publication No. 2000-148927

In another type of conventional connector, instead of the tray, an ejector having a plate portion is used. In order to reduce a size of a card connector, the ejector is arranged to slide inside the card connector with a card mounted thereon, thereby not being ejected outside the card connector. Accordingly, in order to easily insert the card into the card connector, it is necessary to provide a large insertion opening for inserting the card.

In view of the problems described above, an object of the present invention is to provide a card connector with an ejection mechanism capable of solving the problems in the conventional card connectors.

Further objects will be apparent from the following description of the invention.

SUMMARY OF THE INVENTION

According to the present invention, a card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out. In the card connector, the ejection unit includes an inclining member for inclining downwardly a portion of the ejection unit to be pulled out toward the direction that the card is pulled out when the spring member urges the ejection unit in the direction that the card is pulled out.

According to the present invention, the inclining member may include an inclined surface formed on at lease one of a portion of the ejection unit and a portion of the housing abutting against each other.

According to the present invention, the inclined surface formed on the portion of the housing may be disposed at a side of the card to be inserted along the direction that the card is pulled out, and faces the ejection unit. The inclined surface is inclined downwardly toward the side of the card to be inserted along the direction that the card is pulled out.

According to the present invention, the inclined surface formed on the portion of the housing may be disposed to face a backside surface of an abutting portion of the ejection unit abutting against the spring member. Alternatively, the inclined surface formed on the portion of the housing may be disposed to face a rear end surface of a sidewall of the ejection unit at the side of the card to be inserted. The sidewall extends along the direction that the card is inserted into and pulled out.

According to the present invention, the card connector may further include a cover for covering at least a part of an upper surface and a side surface of the housing, so that the cover and the housing form a card accommodation space. The inclining member may include an inclined surface formed on at lease one of a portion of the ejection unit and a portion of the cover abutting against each other.

According to the present invention, the inclined surface formed on the portion of the cover may be inclined downwardly toward the side of the card to be inserted along the direction that the card is pulled out. Corresponding to the inclined surface formed on the portion of the cover, an inclined surface may be formed on a rear end surface of a sidewall of the ejection unit at the side of the card to be inserted. The sidewall extends along the direction that the card is inserted into and pulled out.

According to the present invention, the inclined surface formed on the portion of the cover may include a tongue piece having a semi-circular shape. The tongue piece is formed by bending a part of the cover covering the upper surface of the housing at substantially 90°. Alternatively, the tongue piece is formed of a plate portion formed by bending a part of the cover covering the side surface of the housing.

According to the present invention, the card connector may further include an elastic member disposed in a bottom surface of the ejection unit at the side of the card to be inserted along the direction that the card is inserted into and pulled out. The elastic member protrudes toward a bottom surface of the housing, and is capable of contacting with the bottom surface of the housing.

According to the present invention, the card connector may further include a card engaging portion with a substantially triangular shape disposed on the bottom surface of the ejection unit at the side of the card to be inserted along the direction that the card is inserted into and pulled out. The card engaging portion protrudes into the housing from a side of the card to be pulled out toward the side of the card to be inserted.

According to the present invention, the housing may have a bottom surface having a thickness adjacent to a card insertion opening smaller than that of an inside portion thereof.

DETAILED DESCRIPTION OF PREFERRED EMBODIMENTS

Hereunder, embodiments of the present invention will be explained with reference to the accompanying drawings. According to the present invention, a card connector is provided with an ejection mechanism. The ejection mechanism is a push-push type, in which it is possible to freely insert and pull out a card through pushing the card.

Figure 1:
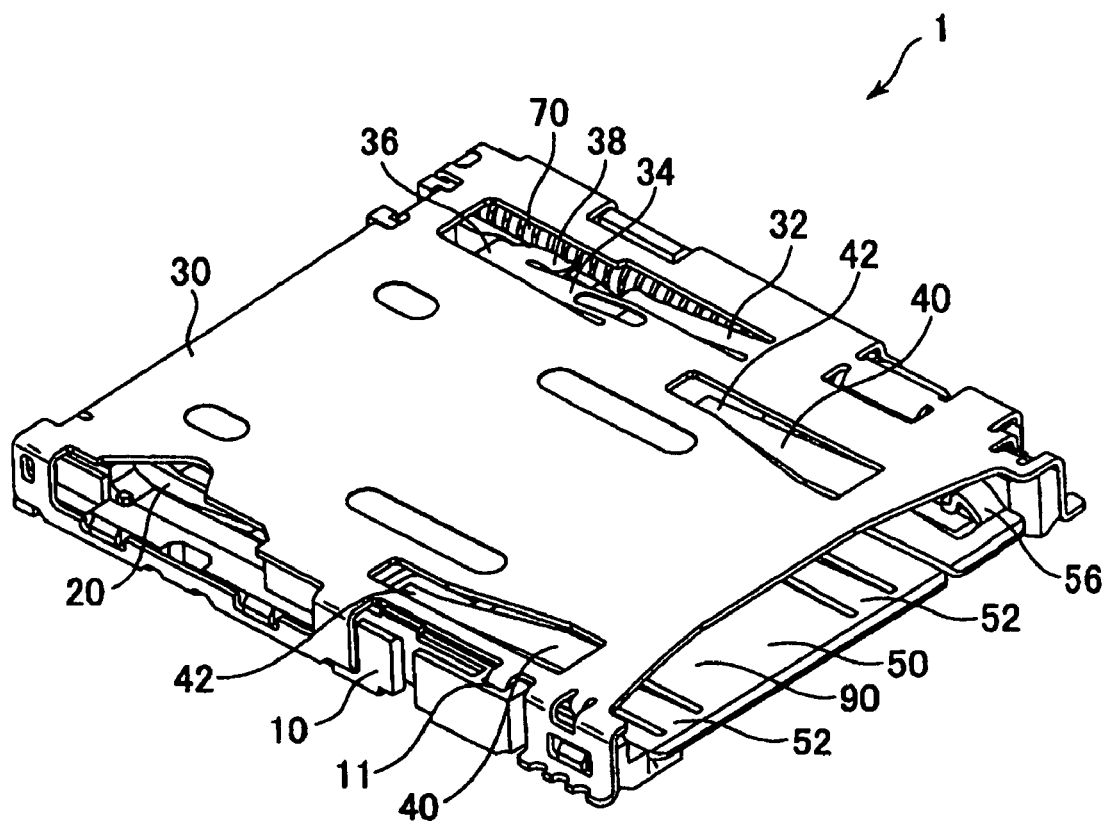
FIG. 1 is a perspective view showing a card connector according to an embodiment of the present invention.
Figure 2:
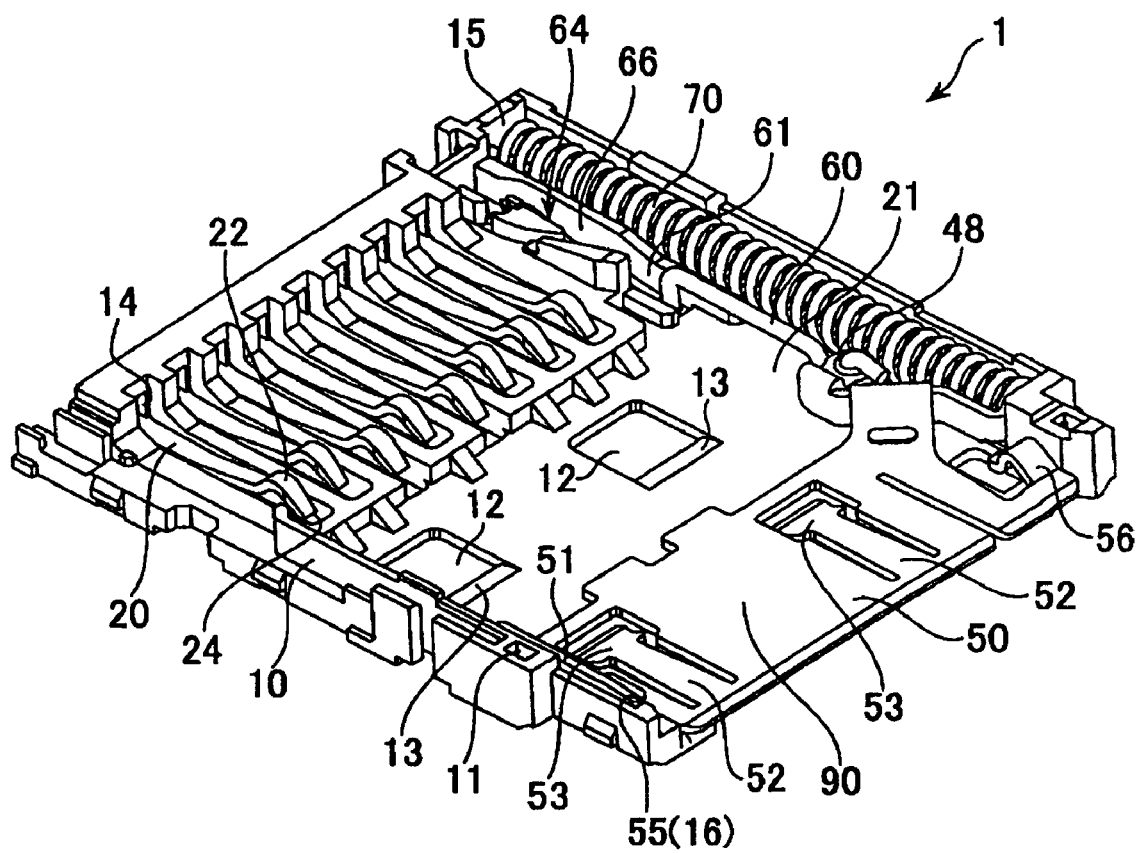
FIG. 2 is a perspective view showing the card connector shown in FIG. 1 without a cover.
Figure 3:
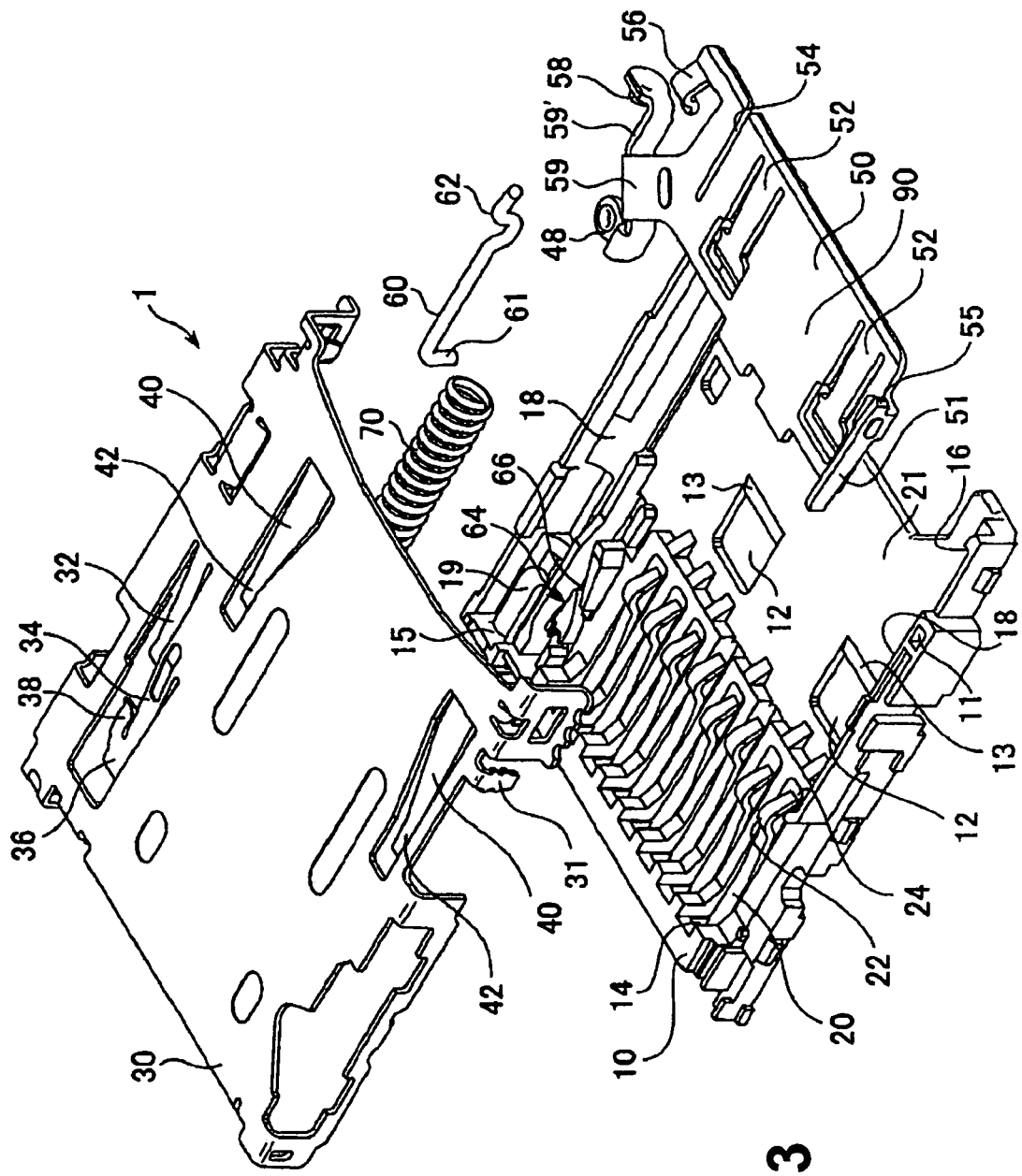
FIG. 3 is an exploded perspective view showing the card connector shown in FIG. 1.
Figure 4:
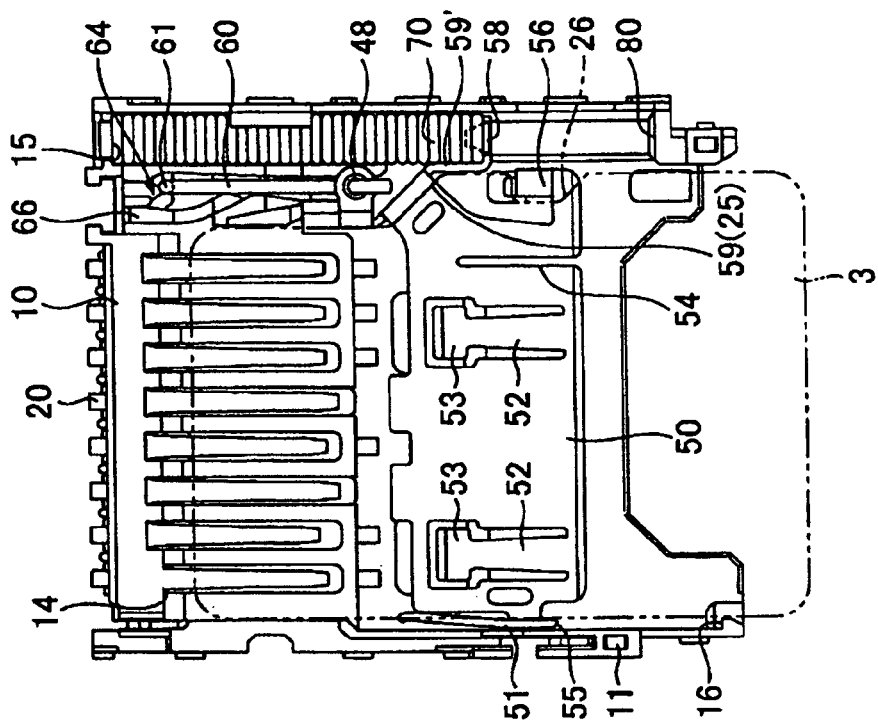
FIGS. 4(a) and 4(b) are plan views showing the card connector when a card is inserted therein.
Figure 4:
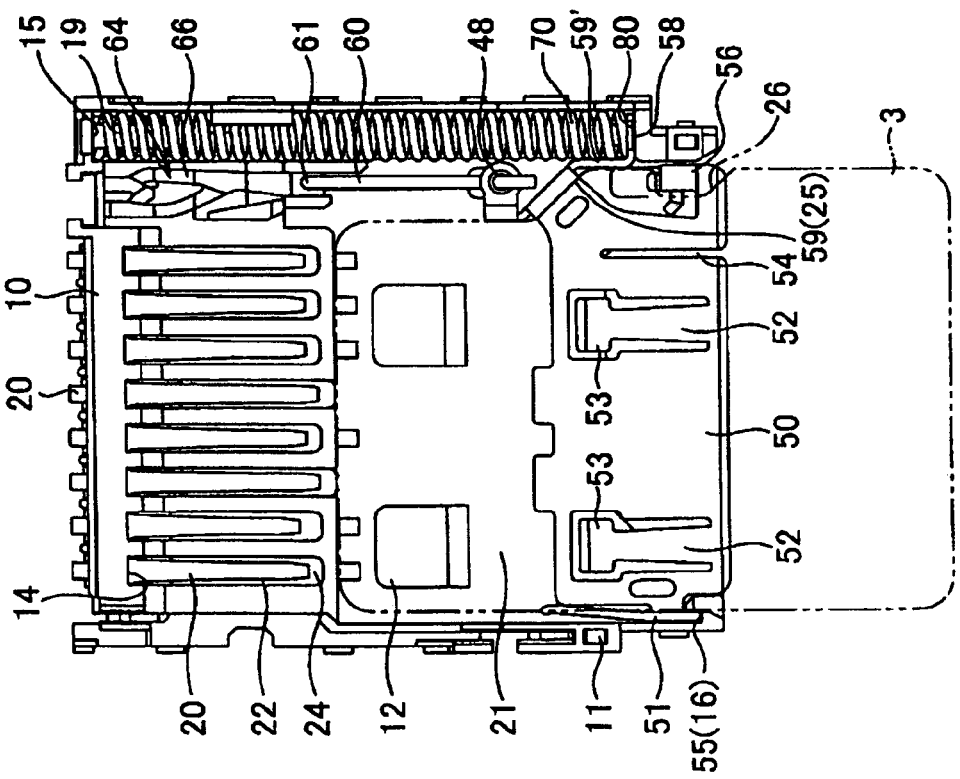

FIG. 1 is a perspective view showing a card connector 1 according to the embodiment of the present invention. FIG. 2 is a perspective view showing the card connector 1 shown in FIG. 1 without a cover. FIG. 3 is an exploded perspective view showing the card connector 1 shown in FIG. 1. FIGS. 4(a) and 4(b) are plan views showing the card connector 1 when a card 3 is inserted therein. In the present invention, the card 3 may include a mini SD card and a micro SD card. In the embodiment, a micro SD card is used as an example.

As shown in FIGS. 1 to 3, the card connector 1 includes a housing 10 made of an insulating material such as a resin; terminals 20 disposed in the housing 10; an ejector 50; a pin 60; a spring 70; and a cover 30 made of metal for covering the housing 10. The cover 30 covers parts of an upper surface and side surfaces of the housing 10, so that the housing 10 and the cover 30 form an accommodation space for accommodating the card 3. Note that another housing member may be provided for covering an upper portion. Accordingly, it is not necessary to provide the cover 30, and only the housing 10 may form the accommodation space.

After main components are assembled in the housing 10, the cover 30 is attached to the housing 10 from above, thereby assembling the card connector 1 having an opening portion at a rear side thereof for inserting a card. A fitted-in portion 31 provided on a sidewall of the cover 30 is fitted into a hole 11 formed in the housing 10, so that the cover 30 is attached to the housing 10.

A plurality of terminal fixing holes 14 is formed in a front surface of the housing 10 for accommodating the terminals 20. Each of the terminals 20 is inserted from a front side of the housing 10 and fixed to corresponding one of the terminal fixing holes 14. When the card 3 is inserted into the card connector 1, corresponding terminal portions (not shown) formed on a bottom surface of the card 3 contact with terminal contacts 22 formed at distal ends of the terminals 20. When the terminal portions of the card 3 contact with the terminal contacts 22, the terminal contacts 20 deform downwardly along terminal grooves 24 for a specific amount.

The ejector 50 is made of metal and disposed inside the housing 10 at a rear side thereof. Inside the housing 10, the ejector 50 abuts against at least one of inner walls 18 of the housing 10, and is held away from a bottom surface 21 of the housing 10. In a state that the card 3 is placed on the ejector 50, the ejector 50 is capable of sliding inside the housing 10 in a direction that the card 3 is inserted and pulled out.

The ejector 50 has a size in a sliding direction (direction that the card 3 is inserted and pulled out) smaller than a whole length of the card 3. For example, the ejector 50 may have a size large enough for supporting just an intermediate portion of the card 3. Accordingly, it is possible to reduce a size of the ejector 50.

The ejector 50 slides between a pulled-out position shown in FIG. 4(a) and a locked position shown in FIG. 4(b). As shown in FIG. 4(a), at the pulled-out position, the card 3 is simply placed on the ejector 50 just before the card 3 is pulled out from the housing 10. In this state, the card 3 is disconnected from the terminals 20. As shown in FIG. 4(b), at the locked position, the card 3 returns slightly after the card 3 is forcefully pushed into the housing 10. In this state, the card 3 is locked at a specific position and connected to the terminals 20.

In the embodiment, the ejector 50 is formed through punching out and bending a single thin metal plate. Alternatively, the ejector 50 may be formed through connecting separately formed members. The ejector 50 has a plate shape including a plate portion 90 extending over a width of the housing 10 in a direction perpendicular to the direction that the card 3 is inserted and pulled out. The ejector 50 is provided at two side portions thereof with a card contacting portion 59 and a sidewall 51 both extending in a direction perpendicular to the bottom surface 21 of the housing 10.

The card contacting portion 59 is provided with a plate wall portion 59' extending in an inclined state relative to the sliding direction from a plate main body on the bottom surface 21 of the housing 10 and having a bent distal end; and a spring contacting portion 58 at an end thereof.

As shown in FIG. 3, the sidewall 51 is curved toward the card contacting portion 59, so that a distance between the sidewall 51 and the card contacting portion 59 decreases toward the front side of the card connector 1. The sidewall 51 is capable of elastically deforming in a horizontal direction (width direction). Further, the sidewall 51 is provided with a rib having a convex shape at a side facing one of the inner walls 18, so that the ejector 50 slides smoothly. When the card 3 is placed on the ejector 50, the card 3 is situated and held between the card contacting portion 59, the plate wall portion 59', and the sidewall 51, thereby preventing the card 3 from jumping out.

A rear edge surface 55 is disposed on the ejector 50 at one side thereof in the width direction for abutting against an inner protruding surface 16 disposed on the housing 10 at one side thereof in the width direction. A backside 82 of the spring contacting portion 58 engages a surface of the housing 10 (an inclined surface 80 to be described later). The pin 60 engages a cam groove 66. Accordingly, the ejector 50 is restricted in moving inside the housing 10 toward the rear side thereof and coming off from the housing 10.

The spring contacting portion 58 is disposed on the ejector 50 at the other side thereof in the width direction for abutting against a rear surface of the spring 70 disposed on the housing 10 at the other side thereof in the width direction. As described above, the pin 60 engages the cam groove 66. Accordingly, the ejector 50 is restricted in moving inside the housing 10 toward the front side thereof. A front surface of the spring 70 abuts against a front inner wall 15 of the housing 10 in a state that a supporting shaft 19 is inserted into the spring 70. Accordingly, the spring contacting portion 58 receives an elastic force of the spring 70, so that the ejector 50 is always urged toward the rear side of the housing 10, that is, in the direction that the card 3 is pulled out from the card connector 1.

When the card 3 is inserted into the card connector 1, the card 3 slides on the plate portion 90 of the ejector 50. Further, the ejector 50 positions and engages the card 3 at a center position thereof. For the positioning, the card 3 is provided with an inclined surface 25 having a width increasing from a front side toward a rear side at one side thereof in the width direction. The card contacting portion 59 of the ejector 50 is provided with an inclined surface corresponding to the inclined surface 25.

A recess portion 26 recessed inwardly in the width direction is formed in the card 3 at a position closer to a card insertion side relative to the inclined surface 25 for the positioning and engagement. A card engaging portion 56 is provided in the ejector 50 for engaging the recess portion 26. The card engaging portion 56 is formed of a part of the plate portion 90 at one side in the width direction of the ejector 50 at a pulled out side of the card 3 along the direction that the card 3 is inserted and pulled out. The card engaging portion 56 has a bent top portion to form a substantially right-angle triangle shape having a steep slope from a front side to a rear side. The card engaging portion 56 elastically protrudes downwardly below the bottom surface of the ejector 50 and is arranged to be capable of deforming.

When the card 3 is inserted into the card connector 1, the card engaging portion 56 abuts against the card 3, so that the card engaging portion 56 is shifted in a direction perpendicular to the direction that the card 3 is inserted and pulled out and the width direction of the card 3. Accordingly, the card engaging portion 56 allows the card 3 to be inserted, and engages the recess portion 26 of the card 3 when the card engaging portion 56 reaches the same.

When the card 3 is inserted into the card connector 1, the inclined surface 25 of the card 3 proceeds inside the housing 10 while pushing the card engaging portion 56 to elastically deform downwardly. When the recess portion 26 reaches the card engaging portion 56, the card engaging portion 56 returns to an original state before the elastic deformation to snap-fit in the inclined surface 25. In this state, the inclined surface 25 of the card 3 abuts against the card contacting portion 59 through elasticity of the sidewall 51. As a result, the card 3 lightly engages and is set at a specific position on the plate portion 90 of the ejector 50.

When the card 3 is pulled toward the rear side of the card connector 1 with a specific force, the card 3 is disengaged from the card engaging portion 56. In the embodiment, a cut portion 54 may be formed in the plate portion 90 at a side portion of the card engaging portion 56 along a direction that the ejector 50 slides, so that the card engaging portion 56 deforms at a portion surrounding the plate portion 90. With the cut portion, it is possible to deform the plate portion 90 of the ejector 50 in the vertical direction, thereby easily deforming the card engaging portion 56.

When the card 3 engages the card engaging portion 56, it is possible to prevent the card 3 from jumping out from the card connector 1 when the card 3 is pulled out from the card connector 1 in a normal pushing operation. In a conventional connector, a card pressing spring is disposed on a cover for pressing a card downwardly from one side or from above, thereby preventing the card from jumping out. In the embodiment, the card connector 1 is provided with pressing springs 40. The pressing springs 40 are formed of cut portions formed in parts of an upper plate of the cover 30. The cut portions have free ends extending in the direction that the card 3 is inserted into the card connector 1, and the free ends are bent downwardly toward the front side of the card connector 1 to form the pressing springs 40.

When the spring 70 has a strong force, it is difficult to completely prevent the card 3 from jumping out with the pressing springs 40 and the engagement described above. Accordingly, it is necessary to adjust the force of the spring 70, thereby making it possible to securely prevent the card 3 from jumping out. In the embodiment, jumping prevention springs 52 formed of elastic pieces are formed in the bottom surface of the ejector 50 to protrude. Escape spaces 12 are formed in the bottom surface 21 of the housing 10, so that elastic portions, especially distal end portions 53, of the jumping prevention springs 52 can freely deform in the escape spaces 12. With the configuration described above, it is possible to prevent the jumping prevention springs 52 from acting on the ejector 50 when the ejector 50 moves in the insertion direction. When the ejector 50 moves in the pulled out direction, the insertion side of the ejector 50 is lifted upwardly, so that the pulled out side of the ejector 50 is inclined downwardly.

A pin fixing hole 48 protruding toward one side in the width direction of the ejector 50 is provided in the ejector 50 at a front side position thereof for engaging the pin 60 in a state that an ejector fixing portion 62 of the pin 60 hooks the pin fixing hole 48. As described above, the pin 60 engages the ejector 50 to move inside the housing 10 together with the ejector 50. Accordingly, a hart cam engaging portion 61 extending from a distal end portion of the pin 60 at a right angle slides along the cam groove 66 of a hart cam mechanism 64 formed along the direction that the card 3 is inserted and pulled out. The cam groove 66 has a hart shape surrounding a hart-shaped island portion 67 disposed at a center of the hart cam mechanism 64.

A first pressing spring 32 and a second pressing spring 34 are formed in the cover 30 for holing and controlling the pin 60 in the cam groove 66 not to come out. The first pressing spring 32 and second pressing spring 34 are formed of cut portions formed in an upper plate of the cover 30. The first pressing spring 32 and second pressing spring 34 have free end portions extending in the direction that the card 3 is inserted into the card connector 1 and bent downwardly toward the front side of the card connector 1.

Figure 5A:
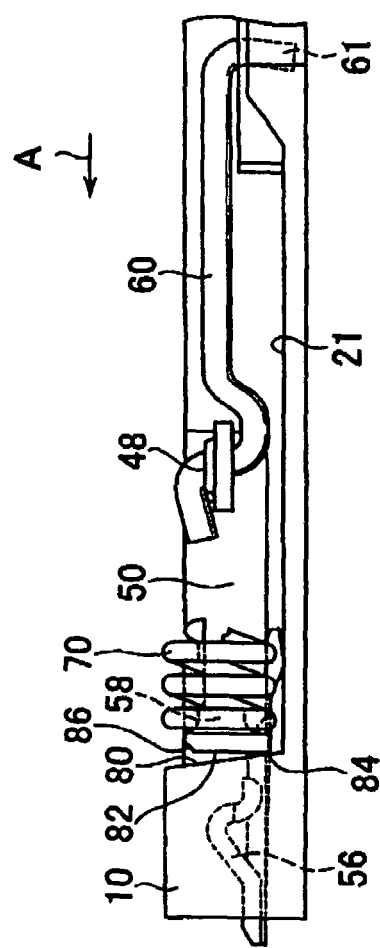
FIGS. 5(a) and 5(b) are sectional views a mechanism of the card connector.

With reference to FIGS. 5(*a*), 5(*b*), 6, 7(*a*), and 7(*b*), a mechanism for making it easy to insert the card 3 will be explained in more detail.

As shown in FIGS. 5(*a*) and 5(*b*), as a first embodiment of the mechanism for making it easy to insert the card 3, the inclined surface 80 is provided on the housing 10. The inclined surface 80 is disposed to face the backside 82 of the spring contacting portion 58 of the ejector 50 at the insertion side of the card 3 along the direction that the card 3 is inserted and pulled out. Further, the inclined surface 80 is disposed in a state inclined downwardly toward the insertion side of the card 3 along the direction that the card 3 is inserted and pulled out. FIGS. 5(*a*) and 5(*b*) are partially enlarged views showing a dimensional relationship between the inclined surface 80 and the backside 82 of the spring contacting portion 58 along the direction that the card 3 is inserted and pulled out. FIGS. 5(*a*) and 5(*b*) substantially correspond to the state shown in FIG. 4(*a*).

As shown in FIG. 5(*a*), when the ejector 50 receives a force of the spring member 70 in an arrow direction A and is pressed against the inclined surface 80 of the housing 10 through the spring contacting portion 58, a lower portion 84 of the backside 82 of the spring contacting portion 58 abuts against a lower end of the inclined surface 80 of the housing 10. Accordingly, the load of the spring member 70 is restricted at the lower portion 84. Afterward, an upper portion 84 is pressed against the inclined surface 80 and inclined.

As s result, as shown in FIG. 5(*b*), the plate portion 90 of the ejector 50 is inclined downwardly at the insertion side of the card 3. As compared with the state shown in FIG. 5(*a*), a card insertion opening between the cover 30 and the plate portion 90 of the ejector 50 becomes larger in a vertical direction. In this state, it is possible to use a surface of the plate portion 90 of the ejector 50 as a guide surface for guiding the card 3. With the configuration described above, it is possible to easily insert the card 3.

Figure 5B:
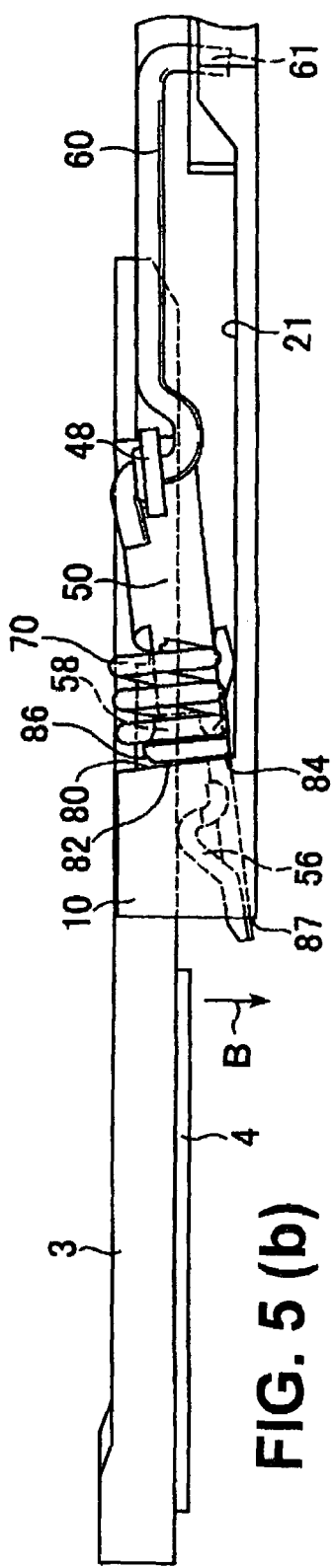

When a taper portion or a step portion tapered downwardly toward the pulled out side is provided on the bottom surface 21 of the housing 10, it is possible to increase an extent of inclination of the ejector 50. As shown in FIG. 5(b), when the card is inserted through the card insertion opening, an insulating seal 4 attached to a backside of the card 3 may contact with an edge 87 of the card insertion opening or an edge of the plate-portion 90, thereby peeling off. When the card insertion opening is made large, it is possible to prevent the insulating seal 4 from peeling off.

In the embodiment, in addition to the inclined surface 80, an inclined surface similar to the inclined surface 80 may be provided on the inner protruding surface 16 of the housing 10. Such an inclined surface is disposed to face the rear edge surface 55 of the sidewall of the ejector 50 arranged along the direction that the card 3 is inserted and pulled out at the pulled out side of the card 3. With the inclined surface provided on the inner protruding surface 16, it is possible to incline the ejector 50 at both left and right sides of the card insertion opening.

Figure 6:
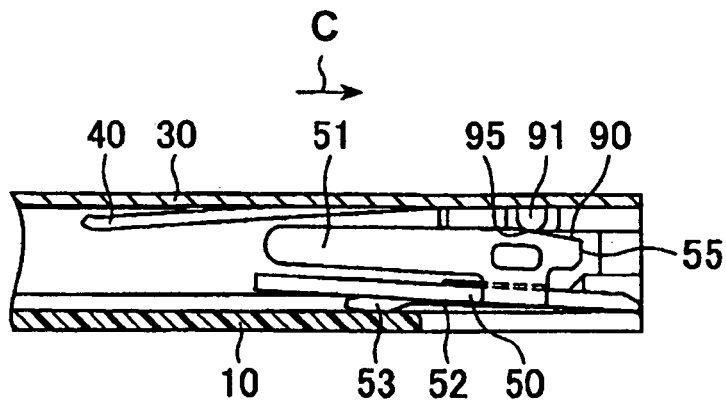
FIG. 6 is a sectional view showing another mechanism of the card connector.

As shown in FIG. 6, as a second embodiment of the mechanism for making it easy to insert the card 3, the sidewall 51 of the ejector 50 may be arranged to abut against a portion of the cover 30. FIG. 6 is an enlarged sectional view showing a dimensional relationship between the sidewall 51 and the cover 30.

In the embodiment, a tongue piece 91 having a semi-circular circumference shape is formed by bending downwardly a part of the cover 30 covering the upper surface of the housing 10 at substantially 90°. The tongue piece 90 is provided with an inclined surface 95 inclined downwardly toward the insertion side of the card 3 along the direction that the card 3 is inserted and pulled out. Corresponding to the inclined surface 95, an inclined surface 90 is provided on an upper surface of the sidewall 51 of the ejector 50 extending along the direction that the card 3 is inserted and pulled out. The inclined surface 90 is inclined downwardly toward the insertion side of the card 3 along the direction that the card 3 is inserted and pulled out.

When the ejector 50 is pressed in an arrow direction C upon receiving the force of the spring member 70, the inclined surface 95 of the cover 30 abuts against the inclined surface 90 of the ejector 50. As a result, the ejector 50 is inclined downwardly toward the insertion side of the card 3, thereby enlarging the card insertion opening in the vertical direction.

In the embodiment, the inclined surfaces 90 and 95 are provided on the tongue piece 91 of the cover 30 and the sidewall 51 of the ejector 50, respectively. Alternatively, an inclined surface may be provided only one of the tongue piece 91 of the cover 30 and the sidewall 51 of the ejector 50. The inclined surface is not limited to a flat surface, and may be formed of a curved surface similar to the tongue piece 91.

Figure 7:
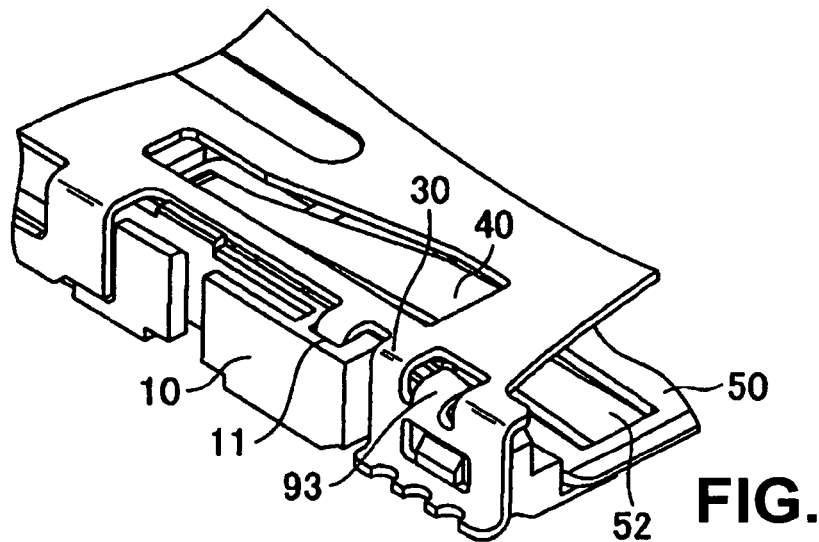
FIGS. 7(a) and 7(b) are sectional views showing a card connector according to another embodiment of the present invention.
Figure 7:
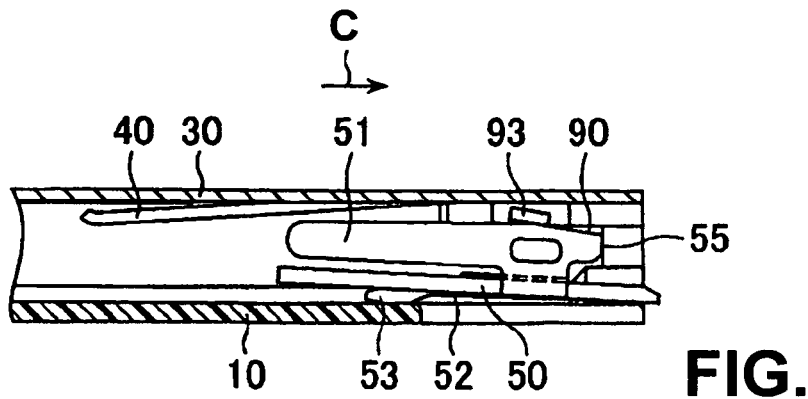

As shown in FIGS. 7(a) and 7(b), in a third embodiment of the mechanism for making it easy to insert the card 3, instead of the tongue piece 91 shown in FIG. 6, a tongue piece 93 with a tapered portion is provided. Other components in the third embodiment are the same as those in the second embodiment shown in FIG. 6.

Different from the tongue piece 91, the tongue piece 93 is formed by bending downwardly a part of the cover 30 covering the side surface of the housing 10 at substantially 90° in a state that the tongue piece 93 is tapered downwardly toward the insertion side of the card 3 along the direction that the card 3 is inserted and pulled out.

When the ejector 50 is pressed in an arrow direction C upon receiving the force of the spring member 70, the tongue piece 93 abuts against the inclined surface 90. As a result, the ejector 50 is inclined downwardly toward the insertion side of the card 3, thereby enlarging the card insertion opening in the vertical direction. Accordingly, it is possible to easily insert the card 3. In the second embodiment, the inclined surface is provided around the circumference of the edge portion of the tongue piece 91. In the third embodiment, the inclined surface is provided on the plate surface of the tongue piece 93, thereby making the inclined surface larger.

In the embodiment, the tongue piece 93 is formed to extend from the side surface of the cover 30. Alternatively, the tongue piece 93 may extend upwardly from the upper surface, and then be bent horizontally. As described above, the jumping prevention springs 52 are always pressed against the bottom surface 21 of the housing 10. With the jumping prevention springs 52, the ejector 50 is always lifted upwardly at the insertion side of the card 3, and is inclined downwardly toward the insertion side of the card 3. Accordingly, the card insertion opening is made large, thereby making it easy to insert the card 3.

In the embodiment, the card engaging portion 56 is provided in the ejector 50 for contacting with the card 3 to incline the ejector 50 downwardly toward the insertion side of the card 3 when the card 3 is inserted. Accordingly, the card insertion opening is made large, thereby making it easy to insert the card 3.

The bottom surface 21 of the housing 10 may have a thickness adjacent to the card insertion opening smaller than that of an inside portion thereof (thickness may be reduced by removing a part of the bottom surface 21). Accordingly, it is possible to incline the ejector 50, thereby making it easy to insert the card 3.

The disclosure of Japanese Patent Application No. 2005-232122, filed on Aug. 10, 2005, is incorporated in the application.

While the invention has been explained with reference to the specific embodiments of the invention, the explanation is illustrative and the invention is limited only by the appended claims.

What is claimed is:

1. A card connector for inserting a card, comprising;
   a housing for accommodating the card, said housing having a front side and a rear side such that the card is inserted into the housing from the rear side;
   a terminal for contacting with the card when the card is inserted into the housing;
   an ejection unit for placing the card and capable of sliding in the housing in a first direction that the card is inserted into the housing and a second direction that the card is pulled out from the housing, said ejection unit including a front portion and a rear portion such that the ejection unit slides in the first direction with the front portion thereof ahead;
   a spring member for urging the ejection unit in the second direction; and
   an inclining member for inclining the ejection unit such that the rear portion shifts downwardly when the spring member urges the ejection unit in the second direction;
   wherein said inclining member includes an inclined surface formed on the housing adjacent to the rear side thereof to face the spring member for pressing against said inclined surface, said inclined surface being inclined downwardly toward the rear side along the second direction.

2. The card connector according to claim 1, wherein said inclined surface is disposed on the housing to face a backside surface of an abutting portion of the ejection unit, said abutting portion abutting against the spring member.

3. The card connector according to claim 1, further comprising an elastic member disposed in a bottom surface of the ejection unit adjacent to the rear portion, said elastic member being capable of contacting with the bottom surface of the housing.

4. The card connector according to claim 1, further comprising a card engaging portion disposed on a bottom surface of the ejection unit adjacent to the rear portion, said card engaging portion having a substantially triangular shape protruding into the housing from the rear side to the front side.

5. The card connector according to claim 1, wherein said housing includes a bottom surface having a thickness increasing from the rear side toward the front side.

6. A card connector for inserting a card, comprising:
   a housing for accommodating the card;
   a terminal for contacting with the card when the card is accommodated in the housing;
   an ejection unit for placing the card and capable of sliding in the housing between a first position where the card can be placed on the ejection unit from outside and a second position where the card contacts with the terminal, said ejection unit including a front portion and a rear portion such that the ejection unit slides from the first position to the second position with the front portion thereof ahead;
   a spring member for urging the ejection unit toward the first position; and
   an inclining member for inclining the ejection unit such that the rear portion shifts downwardly when the spring member urges the ejection unit toward the first position wherein said inclining member includes an inclined surface formed on the housing adjacent to a rear side of the hosing to face the spring member for pressing against said inclined surface, said inclined surface being inclined downwardly toward the rear side along the second position;
   wherein the connector further comprises a cover for covering the housing such that the cover and the housing form a card accommodation space.

* * * * *